United States Patent
Lee et al.

(10) Patent No.: US 9,648,307 B2
(45) Date of Patent: May 9, 2017

(54) DISPLAY APPARATUS AND DISPLAY METHOD THEREOF

(71) Applicant: Samsung Electronics Co., Ltd., Suwon-si, Gyeonggi-do (KR)

(72) Inventors: Kun-woo Lee, Suwon-si (KR); Woo-jong Cho, Suwon-si (KR); Bon-min Koo, Seoul (KR); Jae-kyu Shim, Ansan-si (KR); Cheol-eun Jang, Suwon-si (KR); Hee-seung Choi, Gunpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 14/326,638

(22) Filed: Jul. 9, 2014

(65) Prior Publication Data

US 2015/0015462 A1     Jan. 15, 2015

(30) Foreign Application Priority Data

Jul. 10, 2013 (KR) ........................ 10-2013-0080722

(51) Int. Cl.
*H04N 13/04* (2006.01)

(52) U.S. Cl.
CPC ..... *H04N 13/0402* (2013.01); *H04N 13/0404* (2013.01); *H04N 13/0409* (2013.01); *H04N 13/0484* (2013.01); *H04N 2213/001* (2013.01)

(58) Field of Classification Search
CPC ........ H04N 13/0402–13/0418; H04N 13/0484
See application file for complete search history.

(56) References Cited

U.S. PATENT DOCUMENTS

| 2014/0015942 A1* | 1/2014 | Said ................... G02B 27/2214 348/59 |
| 2014/0035527 A1* | 2/2014 | Hayashigawa ..... B60L 11/1816 320/109 |

FOREIGN PATENT DOCUMENTS

KR     1020120079777     7/2012

* cited by examiner

*Primary Examiner* — Alexander Eisen
*Assistant Examiner* — Cory Almeida
(74) *Attorney, Agent, or Firm* — Staas & Halsey LLP

(57) ABSTRACT

A display apparatus and a display method of a display apparatus to which a 3D display film is attachable are provided. The display method according to various exemplary embodiments of the present general inventive concept includes sensing whether a 3D display film is attached to or detached from a display apparatus, automatically converting the display apparatus into a 3D mode when the 3D display film is attached to cover a display unit of the display apparatus, and automatically converting into a normal mode when the 3D display film is detached from the display apparatus.

20 Claims, 19 Drawing Sheets

DISPLAY APPARATUS AND DISPLAY METHOD THEREOF

CROSS-REFERENCE TO RELATED APPLICATIONS

This application claims the benefit of priority under 35 U.S.C. §119 from Korean Patent Application No. 10-2013-0080722, filed on Jul. 10, 2013 in the Korean Intellectual Property Office, the disclosure of which is incorporated herein by reference in its entirety.

BACKGROUND OF THE INVENTION

1. Field of the Invention

The present general inventive concept relates to a display apparatus and a display method thereof, and more specifically, to a display apparatus to which a three-dimensional (3D) film is attachable and a display method thereof.

2. Description of the Related Art

With the development of electronic technologies, various types of electronic devices are being developed and produced, and a user can have easy access to a small-sized display apparatus in daily life, such as a smartphone and a tablet PC, in addition to a large-sized display apparatus, such as a TV.

Further, a 3D display apparatus for watching a 3D image is also being produced. The 3D display apparatus may be divided into a glasses type system and an autostereoscopic system, depending on whether glasses for watching a 3D image are used.

An example of the glasses type system is a display apparatus in a shutter glass type. The shutter glass type refers to a type which enables a user to feel a stereoscopic effect by outputting a left-eye image and a right-eye image alternatively while opening and closing a left and right shutter glass of 3D glasses worn by a user. A system requiring no glasses is called an autostereoscopic system. An autostereoscopic 3D display apparatus displays a multi-viewpoint image, which is spatially shifted while projecting lights corresponding to different viewpoint images to the left eye and the right eye of a viewer, for example using Parallax Barrier technology or Lenticular lens, thereby enabling a user to feel a stereoscopic effect.

As such, the autostereoscopic system has an advantage of enabling a user to watch a 3D image without glasses. However, the autostereoscopic display apparatus also has a disadvantage in that, in the case of using Parallax Barrier technology, a structure arranged in a display unit results in reduced screen brightness and a narrowed viewing angle compared to a general LCD. In the case of using a Lenticular lens, there are drawbacks in that patterns of waves having a seemingly narrow gap appear due to a lens at the front side of a display unit, product costs are high, and a resolution is degraded.

Further, not all images are required to be displayed in a 3D format in all devices, such as in the case of a smartphone. For example, a smartphone display apparatus may be used mainly for displaying images which need not be realized in 3D, such as a text message, a memo and a calendar.

Therefore, there is a need for a technology which enables a user to readily convert a normal image into a 3D image with a simple manipulation, so as to be appropriately used according to image characteristics.

SUMMARY OF THE INVENTION

The present general inventive concept is devised according to the above needs, and the object of the present general inventive concept is to provide a display apparatus which enables display of a 3D image by attaching a 3D display film to the display apparatus, and a display method thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a display method of controlling a display apparatus to which a 3D display film is attachable, comprising sensing whether the 3D display film is attached to or detached from the display, automatically converting the display apparatus into a 3D mode when the 3D display film is attached to a display unit of the display apparatus, and automatically converting the display apparatus into a normal mode when the 3D display film is detached from the display apparatus.

The display method may further comprise determining an attaching state of the 3D display film when the 3D display film is attached to the display apparatus, and displaying a guide userinterface(UI) to indicate a direction to the 3D display film if the attaching state does not satisfy predetermined requirements.

The display method may further comprise sensing a user's eye gaze, and displaying a guide UI to indicate a direction to adjust the user's eye gaze if an alignment of the user's eye gaze with the display apparatus does not satisfy predetermined requirements.

The 3D display film and the display apparatus may be attached by a magnetic force, and the sensing may use a magnetic field sensor to sense whether the 3D display film is attached.

The 3D display film may include a first concavo-convex portion, the display apparatus may include a second concavo-convex portion and at least one sensor provided in the second concavo-convex portion, the 3D display film may be attached to the display apparatus by connection of the first and the second concavo-convex portions, and the sensing may use the at least one sensor to sense whether the 3D display film is attached.

The 3D display film may include a first concavo-convex portion and a first magnetic body, the display apparatus may include a second concavo-convex unit, a second magnetic body and a magnetic field sensor, the 3D display film may be attached to the display apparatus by connection of the first and the second concavo-convex portions, and the sensing may use the magnetic field sensor to sense whether the 3D display film is attached.

The foregoing and/or other features and utilities of the present general inventive concept may also be achieved by providing a display unit to which a 3D display film is attachable, a sensing unit configured to sense whether the 3D display film is attached to or detached from the display unit; and a control unit configured to automatically convert the display apparatus into a 3D mode when the 3D display film is attached to the display unit, and to automatically convert the display apparatus into a normal mode when the 3D display film is detached from the display unit.

The control unit may be configured to determine an attaching state of the 3D display film when the 3D display film is attached to the display unit, and to display in the display unit a guide UI to indicate a direction to adjust the 3D display film when the attaching state does not satisfy predetermined requirements.

The display apparatus may further include an eye gaze sensing unit configured to sense a user's eye gaze, and may be characterized in that the control unit displays in the display unit a guide UI to indicate a direction to adjust the user's eye gaze if an alignment of the user's eye gaze with the display apparatus does not satisfy predetermined requirements.

The 3D display film and the display unit may each include a magnetic body, and the sensing unit may include a magnetic field sensor to sense whether the 3D display film is attached to the display unit.

The 3D display film may include a first concavo-convex portion, the display unit may include a second concavo-convex portion, the 3D display film may be attached to the display unit by connection of the first and the second concavo-convex portions, a sensing unit may include at least one sensor provided in the second concavo-convex portion, and the control unit may use the at least one sensor to determine whether the 3D display film is attached to the display unit.

The 3D display film may include a first concavo-convex portion and a first magnetic body, the display unit may include a second concavo-convex portion and a second magnetic body, the 3D display film may be attached to the display unit by connection of the first and the second concavo-convex portions, the sensing unit may include a magnetic field sensor configured to sense a magnetic field which is changed according to a magnetic connection between the first magnetic body and the second magnetic body, and the control unit may determine whether the 3D display film is attached to the display unit according to a sensing value of the magnetic field sensor.

The foregoing and/or other features and utilities of the present general inventive concept may also be achieved by providing a display apparatus, comprising a display unit to display a 2D image and a 3D image on a screen thereof, a sensing unit formed at a position of the display apparatus to sense a 3D display element, and a control unit configured to control the display unit to display at least one of the 2D image and the 3D image according to a state of the sensing unit.

The 3D display element may have at least one protrusion corresponding to at least one slot in the display apparatus such that 3D display element may be coupled to the display apparatus.

The 3D display element may be attachable to the display apparatus by at least one of a coupling force and a magnetic force.

The sensing unit may use at least one of a photo sensor, a light-emitting diode and a light-receiving diode, a magnetic force sensor, and a touch sensor to sense the 3D display element.

The sensing unit may comprise a plurality of sensors configured to provide output signals indicating an attaching state of the 3D display element at a plurality of corresponding positions on the display apparatus.

The control unit may be configured to determine an accuracy of the attaching state of the 3D display element at each of the plurality of positions based on the output signals and to communicate an indication of a direction to adjust the 3D display film when one or more of the attaching states do not meet predetermined requirements.

The control unit may be configured to compare the output signals with a reference value to determine whether the attaching states meet the predetermined requirements.

The communicated indication may be an audible message.

The communicated indication may be displayed on the display unit.

The display apparatus may further comprise a gaze sensing unit configured to detect an orientation of a user's gaze, wherein the control unit is configured to communicate an indication of a direction to adjust the alignment of the user's gaze or the display apparatus when the gaze sensing unit detects that the user's gaze is not aligned with the display apparatus according to predetermined requirements.

The foregoing and/or other features and utilities of the present general inventive concept may also be achieved by providing a case for a display apparatus, comprising a frame having a cavity to hold the display apparatus and a 3D display element attached to the frame to be used to display a 3D image of a display unit of the display apparatus disposed in a portion of the frame.

The foregoing and/or other features and utilities of the present general inventive concept may also be achieved by providing a case for a display apparatus, comprising a first frame to hold the display apparatus, and a second frame foldably attached to the first frame and having a 3D display element integrally formed therein.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
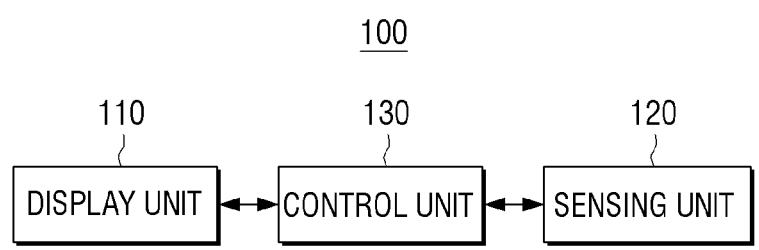
FIG. 1 is a block diagram illustrating a configuration of a display apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating a configuration of a display apparatus 100 according to an exemplary embodiment of the present general inventive concept. As illustrated in FIG. 1, the display apparatus 100 includes a display unit 110, a sensing unit 120 and a control unit 130. The display apparatus 100 may be a mobile phone, which is merely an example, and may be embodied as various electronic apparatuses having the display unit 110, such as, but not limited to, a tablet PC, a digital camera, a camcorder, a laptop computer, a PDA, a GPS navigation system, a portable media player, a portable video game device, or a TV.

The display unit 110 is configured to display an image. The display unit 110 may comprise a screen or a touchscreen and may further serve as an input unit. The display unit 110 may display a normal image, that is, a two-dimensional (2D) image, or it may display a three-dimensional (3D) image, according to an operation mode of the display apparatus 100. A 3D image may be generated by various methods. For example, the display unit 110 may display a frame in which a left-eye image and a right-eye image each are divided in a plurality of vertical lines, and the vertical lines are arranged alternatively to correspond to the respective images. Or, the display unit 110 may display a multi-viewpoint frame by combining, according to a viewpoint, a plurality of object images photographed from different angles.

A 3D display element, such as, for example, a plate or a film, may be attachable to and detachable from the display apparatus 100 to correspond to the display unit 110. It is possible that the 3D display element may be flexible, bendable, or may have a shape to correspond to a surface of the display unit 110. Hereinafter, the 3D display element will be referred to as a 3D display film for convenience but the invention is not limited thereto. A 3D display film refers to a film which enables a user to feel a stereoscopic effect by watching a 3D image displayed on the display unit 110. The 3D display film may be realized, for example, with a Lenticular lens or a Parallax Barrier. If the display unit 110 includes a touch screen, the 3D display film may be formed of a material and form to transmit touch commands from the user through the 3D display film to the display unit 110 when the 3D display film is attached to the display apparatus 100.

The 3D display film may be attached to the display unit 110 or to a portion of the display apparatus 100 by various means, such as, for example, a magnetic body or a concavo-convex connection. Exemplary structures and methods of attaching the 3D display film will be described further below.

The sensing unit 120 is configured to sense whether a 3D display film is attached to the display apparatus 100 or detached therefrom. The sensing unit 120 may be realized in various forms according to an attaching method of the 3D display film. For example, in an exemplary embodiment wherein a 3D display film is attached by a magnetic force of a magnetic body, the sensing unit 120 may be implemented as a magnetic force sensor. Or, in an exemplary embodiment wherein a 3D display film is attached by connection of concavo-convex portions, the sensing unit 120 may be implemented as one or more various types of sensors to sense a touch, connection, or electrical connection of the concavo-convex portions.

The control unit 130 is configured to control the overall operation of the display apparatus 100. The control unit 130 performs different operations depending on whether the 3D display film is attached to or detached from the display unit 110 or a portion of the display apparatus 100. Specifically, when the sensing unit 120 senses that the 3D display film 210 is attached to the display apparatus 100 such that the 3D display film 210 corresponds to a screen of the display unit 110, the control unit 130 automatically converts an operation mode of the display apparatus 100 into a predetermined mode, for example, a 3D mode.

In contrast, when the sensing unit 120 senses that the 3D display film 210 is detached from the display unit 110 or portion of the display apparatus 100, the control unit 130 automatically converts an operation mode of the display apparatus 100 into a another mode, for example, a normal mode. In the present application, "3D mode" refers to an operation mode of displaying a 3D image as mentioned above, and "normal mode" refers to an operation mode of displaying a 2D image. When the operation mode is converted into the 3D mode, the control unit 130 may convert various screens, such as a home screen, an icon display screen, an executing screen of various applications and a contents playing screen, into a 3D image, and display the converted screens via the display unit 110.

The display unit 110 may therefore display a 3D image or a 2D image according an operation mode of the control unit 130. As such, the display unit 110 displays a 2D image and a 3D image according to a state of a sensor thereof.

Figure 2:
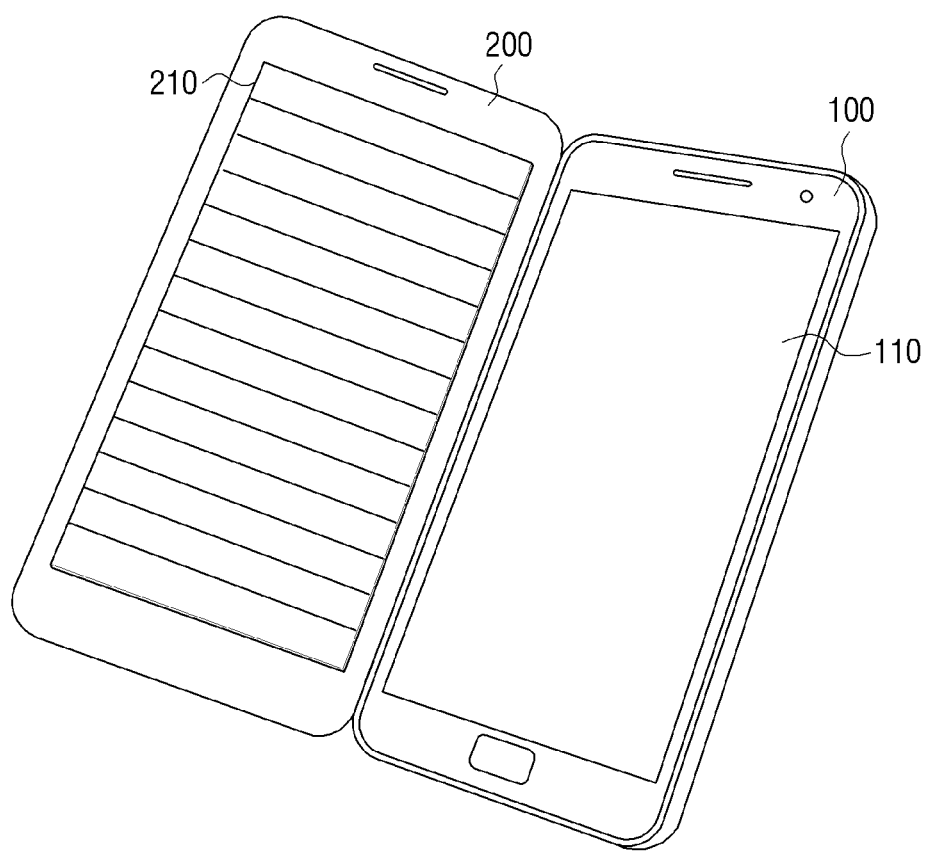
FIG. 2 is a view illustrating a state wherein a 3D display film is not attached to a display apparatus according to an exemplary embodiment of the present general inventive concept.
Figure 3:
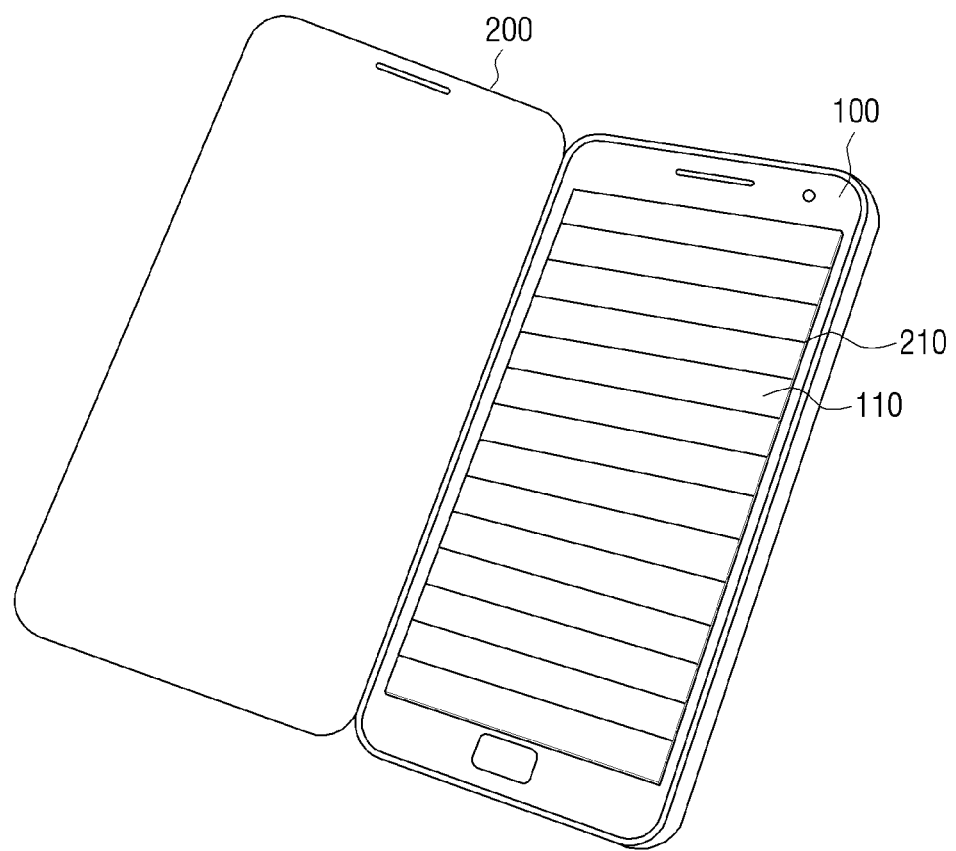
FIG. 3 is a view illustrating a state wherein a 3D display film is attached to a display apparatus according to an exemplary embodiment of the present general inventive concept.

FIGS. 2 and 3 are views of a state wherein a 3D display film 210 is detached from or attached to the display unit 110, respectively. FIG. 2 illustrates the display apparatus 100 embodied as a mobile phone having a display unit 110 for illustrative purposes. However, the display apparatus 100 is not limited to this embodiment. As illustrated in FIG. 2, the display apparatus 100 may be mounted in a separate mobile phone case 200.

A pocket or other means for holding the 3D display film may be provided in a portion of the mobile phone case 200. FIG. 2 illustrates a state where the 3D display film 210 is held in a cover side in the mobile phone case 200. The mobile phone case 200 may have another portion to hold the display apparatus 100. If necessary, a user may detach the 3D display film 210 from the mobile phone case 200 and attach the 3D display film 210 to the display apparatus 100.

FIG. 3 illustrates a state wherein the 3D display film 210 is detached from the mobile phone case 200 and attached to the display apparatus 100 by a user. The 3D display film 210 may be manufactured in a size and shape identical or similar to a size and shape of the display unit 110, so as to cover the whole display unit 110 or a portion thereof. Further, the 3D display film 210 may be directly attached to the display apparatus 100, the display unit 110 of the display apparatus 100, or to a peripheral body region of the display unit 110 to cover a screen of the display unit 110.

As illustrated in FIG. 3, when the 3D display film 210 is attached to the display unit 110, the control unit 130 may convert into a 3D mode automatically, and when detached, may convert into a normal mode or a previous mode automatically.

Although illustrated in FIGS. 2 and 3 that the 3D display film 210 may be held in the mobile phone case 200, the mobile phone case 200 is not an essential element, and the 3D display film 210 may be carried separately from the mobile phone case 200 or the display apparatus 100.

Further, although illustrated in FIG. 3 that the 3D display film 210 is completely detached from the mobile phone case 200 to be attached to the display unit 110, it may also be embodied that the 3D display film may be attached to the display unit 110, while one end of the 3D display film is attached to the mobile phone case 200.

Figure 4:
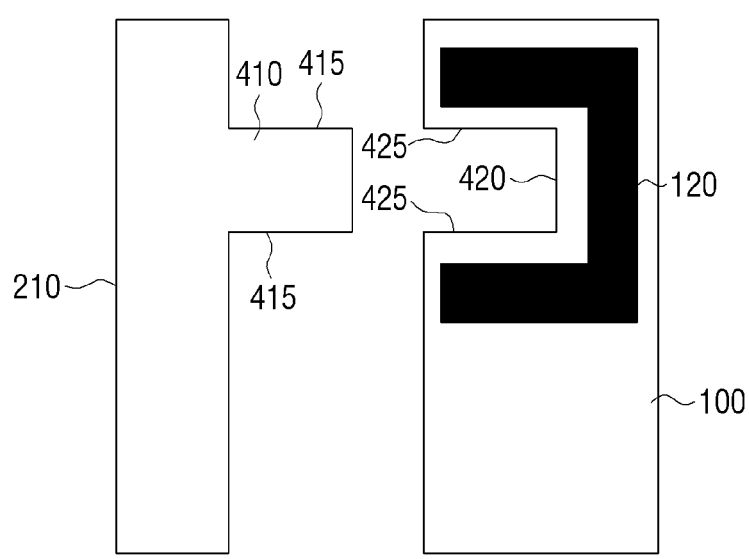
FIG. 4 is a view illustrating an exemplary embodiment of the present general inventive concept in which a display apparatus and a 3D display film are attached by a concavo-convex portion.
Figure 5:
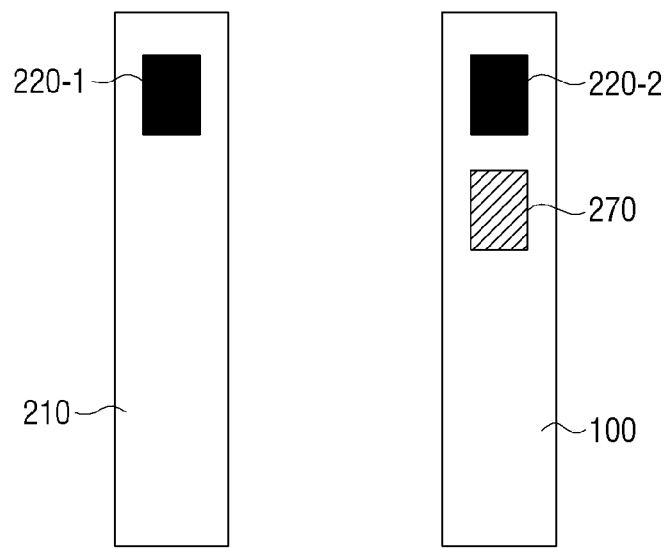
FIG. 5 is a view illustrating an exemplary embodiment of the present general inventive concept in which a display apparatus and a 3D display film are attached by a magnetic body.
Figure 6:
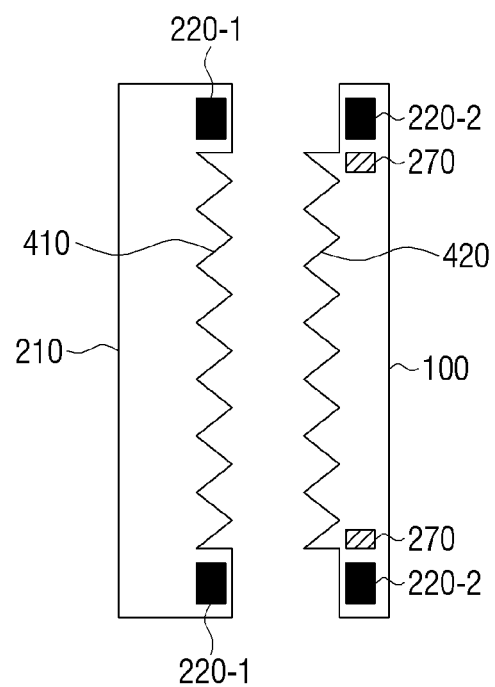
FIG. 6 is a view illustrating an exemplary embodiment of the present general inventive concept in which a display apparatus and a 3D display film are attached by a concavo-convex portion and a magnetic body.

The 3D display film 210, which may be a film type or a plate type, may also be attached to the display apparatus 100 by various methods. FIGS. 4 to 6 illustrate various examples of attaching the 3D display film 210.

FIG. 4 is a view illustrating an example of attaching by a concavo-convex method.

As illustrated in FIG. 4, the 3D display film 210 includes a first concavo-convex portion 410, and the display apparatus 100 includes a second concavo-convex portion 420. 410 and 420 may be referred to as a connecting element to connect or attach the 3D display film 210 to the display apparatus 100 or to place the 3D display film 210 over the display unit 110.

In FIG. 4, the first concavo-convex portion 410 is in a convex shape, and the second concavo-convex portion 420 is in a concave shape, and as a result, can be combined by being engaged with each other. The 3D display film 210 may be attached to the display apparatus 100 by connection of the first and the second concavo-convex portions 410, 420.

For convenient explanation, FIG. 4 illustrates that the first concavo-convex portion 410 and the second concavo-convex portion 420 have side surfaces 415 and 425, respectively. The side surfaces 415 and 425 may be flat side surfaces. However, the side surfaces 415 and 425 may be manufactured to have a curve shape so as to improve combining force. Further, the first concavo-convex portion 410 and the second concavo-convex portion 420 may have side surfaces 415 and 425 which are made of an elastic material having elasticity above a certain level. By manufacturing in this manner, combining force between the first and the second concavo-convex portions is improved, such that the concavo-convex portions may be attached or detached only when a user applies a certain physical force.

Further, In FIG. 4, although the first concavo-convex portion 410 is in a convex shape, and the second concavo-convex portion 420 is in a concave shape, the shape of the first and the second concavo-convex portions is not limited thereto, and various shapes are available as long as connection is enabled.

Further, opposite to FIG. 4, the first concavo-convex portion 410 may be in a concave shape, and the second concavo-convex portion 420 is in a convex shape.

Although illustrated in FIG. 4 that there is only one first concavo-convex portion 410 and only one second concavo-convex 420, there may be a plurality of concavo-convex portions, for example, arranged in series.

The first and the second concavo-convex portions 410, 420 may be provided in the display apparatus 100, in the display unit 110, or in a peripheral region of the display unit 110 in order not to block a user's view of the display unit 110.

In an exemplary embodiment where the 3D display film 210 is attached by connection of the first and the second concavo-convex portions 410, 420, the sensing unit 120 may sense connection of the first and the second concavo-convex portions 410, 420. Specifically, the sensing unit 120 may be embodied, for example, as a photo sensor, a touch sensor, a resistance sensor, a capacitive (PI) sensor, a pressure (PR) sensor, a magnetoresistive (MR) sensor or a Hall sensor and the like.

FIG. 4 illustrates the sensing unit 120 as a photo sensor. The photo sensor sensing unit 120 may be arranged in the second concavo-convex portion 420 of the display apparatus 100. Accordingly, when the 3D display film 210 is detached, light having a size above a certain level enters the photo sensor sensing unit 120, and when the 3D display film 210 is attached, light is prevented from entering the photo sensor. Thus, as an output value of the photo sensor sensing unit 120 is changed depending on whether the 3D display film is attached or detached, the control unit 130 may determine whether the 3D display film is attached or detached based on the output value of the photo sensor sensing unit 120.

In another exemplary embodiment, the sensing unit 120 may be embodied as a light emitting diode and a light receiving diode arranged at a side surface of the second concavo-convex portion 420. In this case, when the 3D display film is detached, light emitted from the light emitting diode enters a light receiving diode, and when the 3D display film is attached, light emitted from the light emitting diode is blocked by the first concavo-convex portion 410, and thus, light does not enter the light receiving diode. Thus, as an output value of the light receiving diode is changed depending on whether the 3D display film is attached or detached, the control unit 130 may determine whether the 3D display film is attached or detached based on the output value of the light receiving diode.

In another exemplary embodiment, the sensing unit 120 may be embodied as a resistance sensor or a touch sensor, which senses electric resistance changed according to touch between a contact provided at the end of the first concavo-convex portion 410 and a contact provided in the second concavo-convex portion 420.

FIG. 5 is a view to explain an exemplary embodiment of the present general inventive concept in which a display apparatus 100 and a 3D display film 210 are attached by a magnetic force. In FIG. 5, the 3D display film 210 includes a first magnetic body 220-1, and the display apparatus 100 includes a second magnetic body 220-2. The first and the second magnetic bodies 220-1, 220-2 may be any material having an attractive force by a magnetic force. Accordingly, when the 3D display film 210 approaches the vicinity of the display apparatus 100, the 3D display film 210 is attached by an attractive force between the first and the second magnetic bodies 220-1, 220-2.

When the display apparatus 100 and the 3D display film 210 are attached by a magnetic force, the sensing unit 120 of the display apparatus 100 may include a magnetic force sensor 270. The magnetic force sensor 270 refers to a sensor which outputs an electric signal corresponding to a peripheral magnetic field change. Specifically, the magnetic force sensor 270 may be configured to have a core and a coil winding the core, and may be embodied as a coil type magnetic sensor which outputs an electric signal induced from a coil according to a magnetic field change, or as a solid-state magnetic sensor which has solid properties and uses magnetic field dependence.

If a signal sensed by the magnetic force sensor of the sensing unit 120 is suddenly changed while the displayed apparatus 100 and the 3D display film 210 are in a detached state, the control unit 130 may determine that the 3D display film 210 has been attached. Further, if a signal sensed by the magnetic force sensor of the sensing unit 120 is suddenly changed while a 3D display image is displayed, the control unit 130 of the display apparatus 100 may determine that the 3D display film 210 has been removed.

Although FIG. 5 illustrates using only one first magnetic body 220-1, only one second magnetic body 220-2 and only one magnetic force sensor 270, a plurality of the first and the second magnetic bodies 220-1, 220-2 and magnetic force sensors 270 may be used. When there are a plurality of magnetic force sensors 270, the control unit 130 may even determine whether the 3D display film 210 is completely attached or a certain part thereof is not appropriately attached.

Although FIGS. 4 and 5 illustrate an exemplary embodiment of using a combining force between concavo-convex portions and an exemplary embodiment of using a magnetic force, respectively, an exemplary embodiment of using both the combining force between concavo-convex portions and the magnetic force is provided below.

FIG. 6 is a view of an exemplary embodiment of the present general inventive concept in which a display apparatus and a 3D display film are attached by using both the combining force between concavo-convex portions and the magnetic force. When the 3D display film 210 is attached to the display apparatus 100, if the 3D display film 210 is moved while displaying a 3D image, resolution of the 3D image may be degraded. Therefore, in order for the 3D display film 210 not to be easily detached from the display apparatus 100, both the combining force between concavo-convex portions and the magnetic force may be used for attaching the 3D display film, as illustrated in FIG. 6.

Specifically, the 3D display film 210 and the display apparatus 100 may include a first and a second concavo-convex portions 410, 420 which are engaged with each other, and a first and a second magnetic bodies 220-1, 220-2.

Further, the sensing unit 120, which includes a magnetic force sensor 270, may sense whether the display apparatus 100 and the 3D display film 210 are attached or detached. Although FIG. 6 illustrates only the magnetic force sensor 270, a sensor which senses connection of the concavo-convex portions may alternatively be embodied, or all of the sensors may be used in combination.

In a 3D image, images having different viewpoints are arranged in each vertical line. Accordingly, a 3D image cannot be appropriately provided if the 3D display film 210 and the display unit 110 of the display apparatus 100 are not attached accurately. Thus, the 3D display film 210 and the display apparatus 100 are required to be attached accurately. However, when a user freely attaches or detaches the 3D display film, there may be a case where the 3D display film 210 is not attached at an exact position. According to another exemplary embodiment of the present general inventive concept, a guide user interface (UI) is provided to solve the problem which may occur when the 3D display film 210 is not accurately attached.

FIGS. 7 to 12 illustrate an operation of the display apparatus 100 according to an exemplary embodiment of providing a guide UI.

Figure 7:
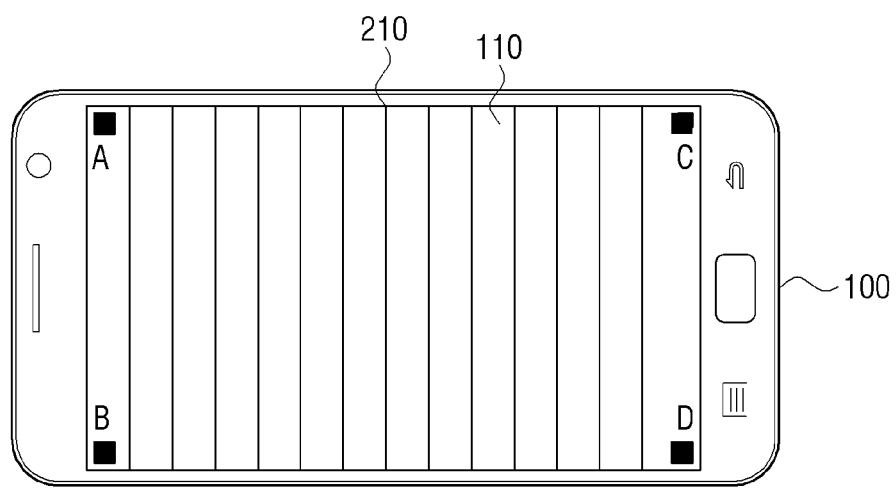
FIG. 7 is a view illustrating an outer configuration of a display apparatus for which a sensor is provided to sense whether a 3D display film is attached according to an exemplary embodiment of the present general inventive concept.

FIG. 7 illustrates an example in which the display apparatus 100 includes a plurality of sensors. For example, sensors A, B, C and D may be arranged at each edge of the display unit 100, as illustrated in FIG. 7.

In order for the display unit 110 to display a 3D image with high resolution, the 3D display film 210 is required to be attached accurately, and when attached, sensors A, B, C and D sense the attaching state. Thus, based on the sensing results by sensors A, B, C and D, the control unit 130 may determine whether the 3D display film is attached accurately according predetermined requirements.

Figure 8:
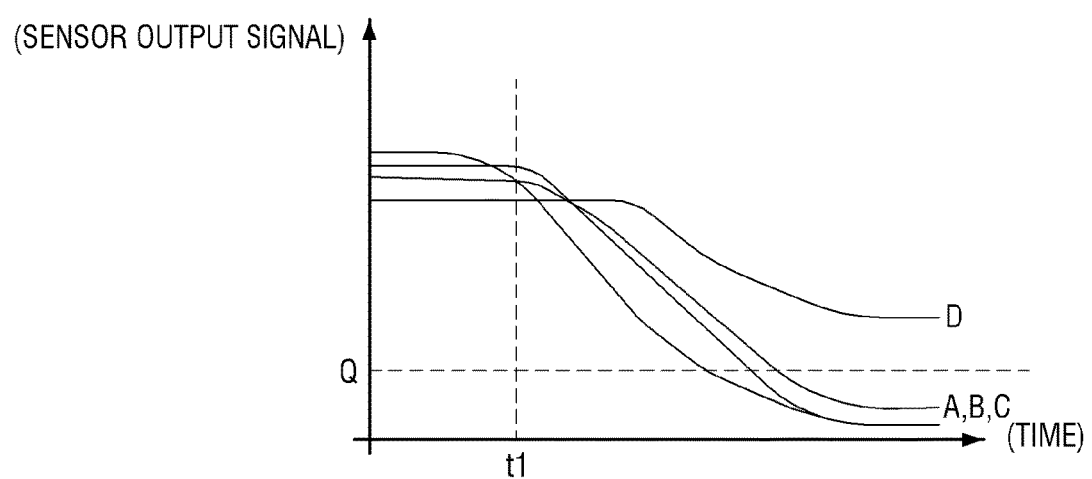
FIG. 8 is a graph illustrating an output signal of a sensor for sensing whether a 3D display film is attached according to an exemplary embodiment of the present general inventive concept.

FIG. 8 is a graph illustrating an example of an output signal of a sensor according to sensing results sensed by sensors A, B, C and D. Sensors A, B, C and D output signals having a certain size before the 3D display film 210 is attached to the display apparatus 100.

A sensor output signal is suddenly changed at time t1. At the time when the output signal sensed by the sensing unit 120 is suddenly changed, the control unit 130 may determine that the 3D display film 210 has been attached to the display apparatus 100 by using a relative value comparison or an absolute value comparison of the sensor output signals. For example, if each of the sensor output signals change a predetermined amount at time t1, the control unit 130 may determine that the 3D display film 210 has been attached. However, if a predetermined number of the sensor output signals do not change a predetermined amount at time t1, the control unit may determine that the 3D display film 210 has not been attached to the display apparatus 100.

Furthermore, if each of the sensor output signals change at time t1 but there is a variation among the signal changes, the control unit 130 can determine whether there is an issue with one or more of the positions of the 3D display film 210 corresponding to the respective output sensors. Referring to FIG. 8, with respect to a sensor output signal after the time t1, it can be seen that sensor output signals of sensors A, B and C are nearly consistent in their respective change proportions, while a sensor output signal of sensor D is not consistent with the other output signals A, B and C. Accordingly, the control unit 130 may determine that an attaching state at the position of sensor D is different from an attaching state at the positions of sensors A, B and C.

The control unit 130 may determine which output sensor signals indicate positions of the 3D display film 210 that have correct attaching states. The attaching states of various positions of the 3D display film 210 may be evaluated, for example, by comparing an amount of change in the positions' respective sensor output signals to a predetermined level. For example, the control unit 130 may determine that the change in output signals of sensors A, B and C is beyond a threshold Q, while the change in the output signal of sensor D is not beyond threshold Q, as shown in FIG. 8.

Thus, the control unit 130 may determine that the output signal of sensor D indicates that the attaching state of the 3D display film 210 at the position of sensor D is incorrect. The control unit 130 may further control the display unit 100 to display a guide UI to provide guidance on how to adjust the 3D display film 210, accordingly.

Figure 9:
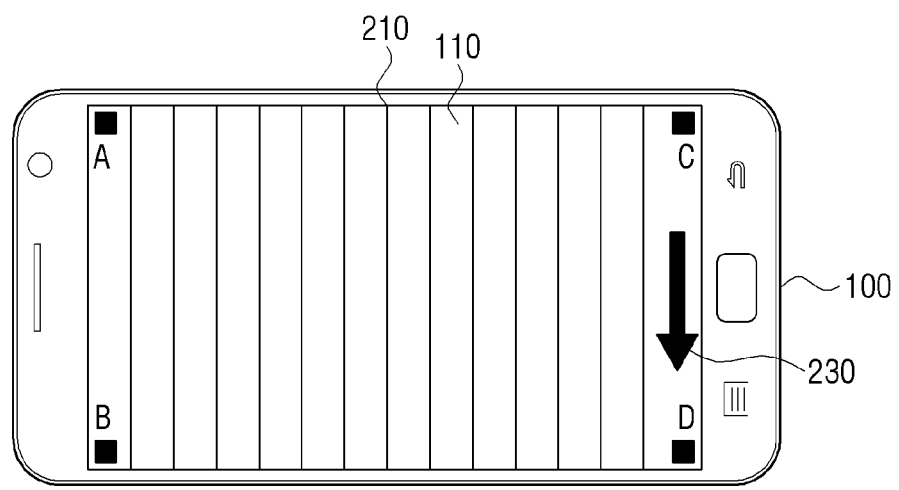
FIG. 9 is a view illustrating a guide UI for adjusting an attaching state according to an exemplary embodiment of the present general inventive concept.

FIG. 9 is a view illustrating an example in which the display unit 110 displays a guide UI 230 having an arrow shape, according to an exemplary embodiment of the present general inventive concept. The control unit 130 determines that the output signal of sensor D is different from the output signals of sensors A, B and C, and that the position of the 3D display film 210 at position D is likely incorrect. Therefore, the control unit 130 controls the display unit 110 to display the guide UI 230 having an arrow shape, which points to sensor D so that a user checks the position of the 3D display film 210 at sensor D.

Accordingly, based on sensing results sensed by a plurality of sensors, the control unit 130 may calculate property values, such as pixel coordinates as to where the guide UI 230 is to be displayed, as well as a shape, a size and a color of the guide UI 230. For example, if correct attaching states of sensors A to C are sensed, while a correct attaching state of sensor D is not sensed, a guide UI 230 may be determined to be displayed at a region between sensor C and sensor D, and a pixel value may be calculated to display the guide UI 230 as having an arrow shape, which indicates the 3D display film 210 should be moved from sensor C in the direction of sensor D. At the determined position, the control unit 130 performs rendering of a graphic object according to a calculated pixel value. Accordingly, the arrow-shaped guide UI 230 may be displayed on a screen of the display unit 110.

The arrow-shaped guide UI 230 illustrated in FIG. 9 and described above is merely an exemplary embodiment. The guide UI 230 may be displayed using any of a variety of shapes or colors. Other examples could include a text message displayed on the display unit 110, a voice message transmitted to a user, or any combination of indications thereof.

Figure 10:
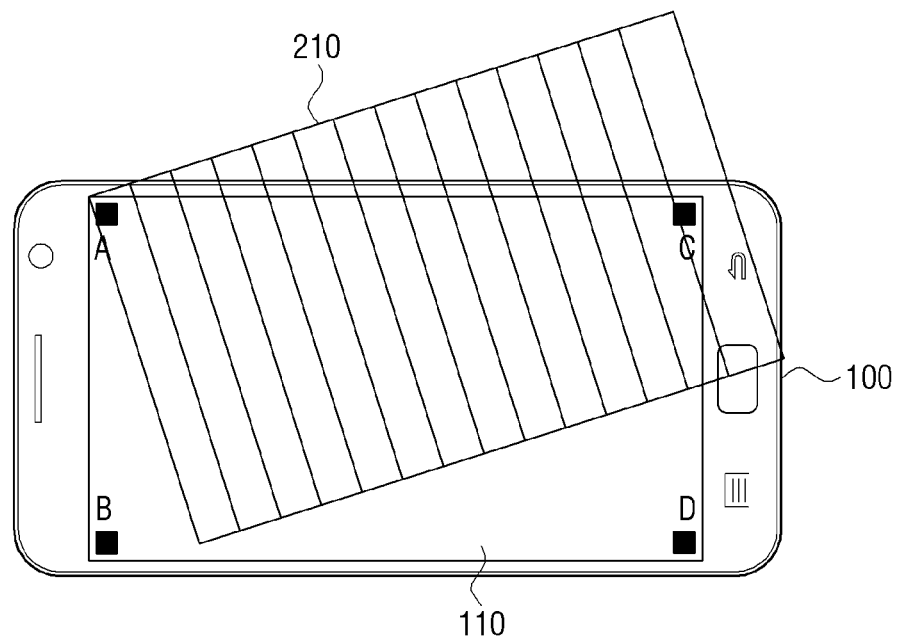
FIG. 10 is a view illustrating an example in which a 3D display film is incorrectly attached.

FIG. 10 is a view illustrating an example in which the display apparatus 100 and the 3D display film 210 are not accurately attached at the positions of sensors B, C and D, excluding the position of sensor A, according to an exemplary embodiment of the present general inventive concept.

Figure 11:
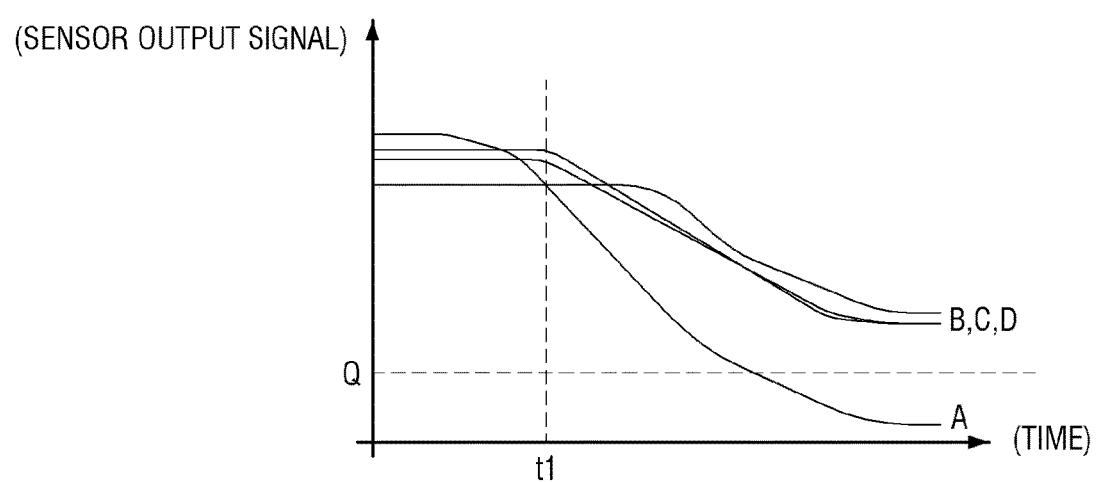
FIG. 11 is a graph illustrating an output signal of a sensor in the state of FIG. 10.

As illustrated in FIG. 11, sensors A, B, C and D may sense a certain signal before the 3D display film 210 is attached to the display apparatus 100. A sensor output signal is suddenly changed at time t1. At the time when the output signal sensed by the sensing unit 120 is suddenly changed, the control unit 130 may determine that the 3D display film 210 is attached to the display apparatus 100. With respect to a sensor output signal after the time t1, it can be seen that sensor output signals of sensors B, C and D are nearly consistent in their respective change proportions, while a sensor output signal of sensor A is not consistent with the other output signals B, C and D. The control unit 130 may therefore determine that an attaching state of the 3D display film 210 and the display apparatus 100 at the position of sensor A is different from the attaching state at the positions of sensors B, C and D.

The control unit 130 may further determine which output sensor signals indicate positions of the 3D display film 210 that have correct attaching states. For example, in this case the control unit 130 may determine that the sensor output signal of sensor A is greater than threshold Q, while the sensor output signals of B, C and D is less than threshold Q, thereby indicating that the attaching state at the position of sensor A is likely to be correct while the attaching state at the remaining sensors B, C and D is likely to be incorrect.

Thus, when the control unit 130 determines that the attaching state of the 3D display film 210 and the display apparatus 100 at the position of sensor A is different but is more likely to be correct as compared to the attaching state of the 3D display film 210 at the positions of sensors B, C and D, the control unit 130 controls the display unit 100 to display the guide UI 230 to adjust the 3D display film accordingly.

Figure 12:
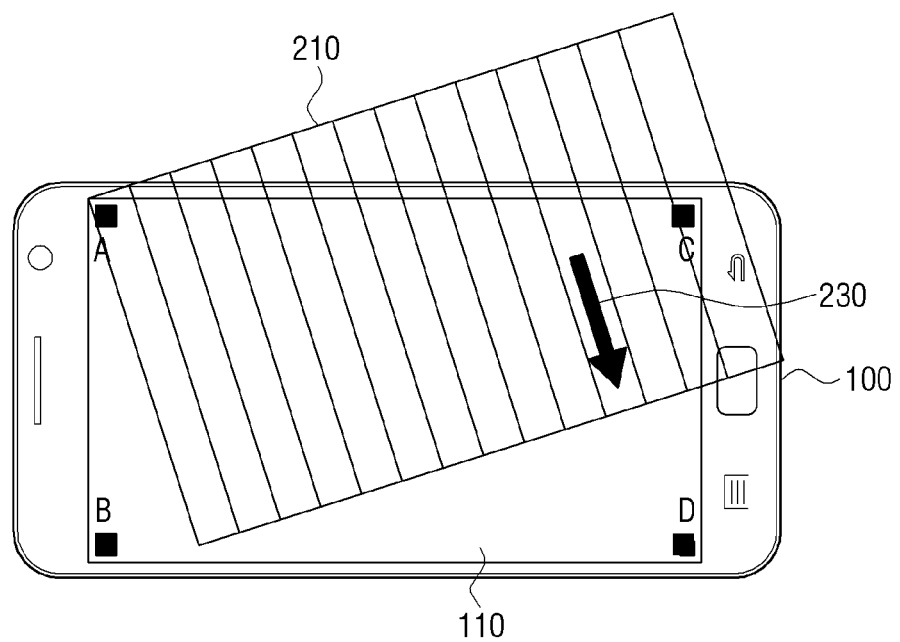
FIG. 12 is a view illustrating an example of a guide UI displayed in the state of FIG. 10 according to an exemplary embodiment of the present general inventive concept.

For example, as illustrated in FIG. 12, the display unit 110 may display the guide UI 230 having an arrow shape. The control unit 130 determines that the 3D display film 210 is required to be moved from the position of sensor C toward the position of sensor D. Therefore, the control unit 130 controls the display unit 100 to display the guide UI 230 having an arrow, which points to a direction of sensor D from the position of sensor C. A method of displaying the guide UI 230 by the display unit 110 may be the same as that described regarding FIG. 9.

Even when the 3D display film 210 is correctly attached to the display unit 110, a user may not feel a 3D stereoscopic effect appropriately if the display apparatus 100 is not seen at a correct position. Accordingly, another exemplary embodiment of the present general inventive concept describes sensing a user's eye gaze to induce a user to watch with a correct position.

Figure 13:
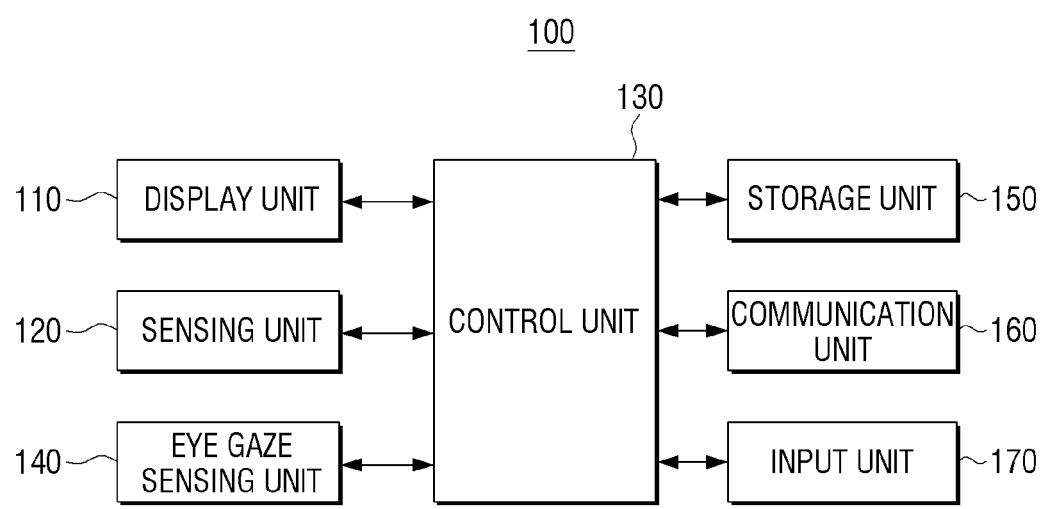
FIG. 13 is a block diagram illustrating a configuration of a display apparatus according to another exemplary embodiment of the present general inventive concept.

FIG. 13 is a block diagram illustrating a configuration of a display apparatus 100 according to another exemplary embodiment of the present general inventive concept. As illustrated in FIG. 13, the display apparatus 100 includes a display unit 110, a sensing unit 120, a control unit 130, an eye gaze sensing unit 140, a storage unit 150, a communication unit 160 and an input unit 170.

FIG. 13 illustrates an overall configuration of various constituent elements by taking an example of a case wherein the display apparatus 100 includes various functions, such as a display function, a communication function, a video playing function and an image mode conversion function. Thus, some constituent elements thereof may be omitted or changed, or other constituent elements may be further added, depending on requirements of an exemplary embodiment.

Figure 14:
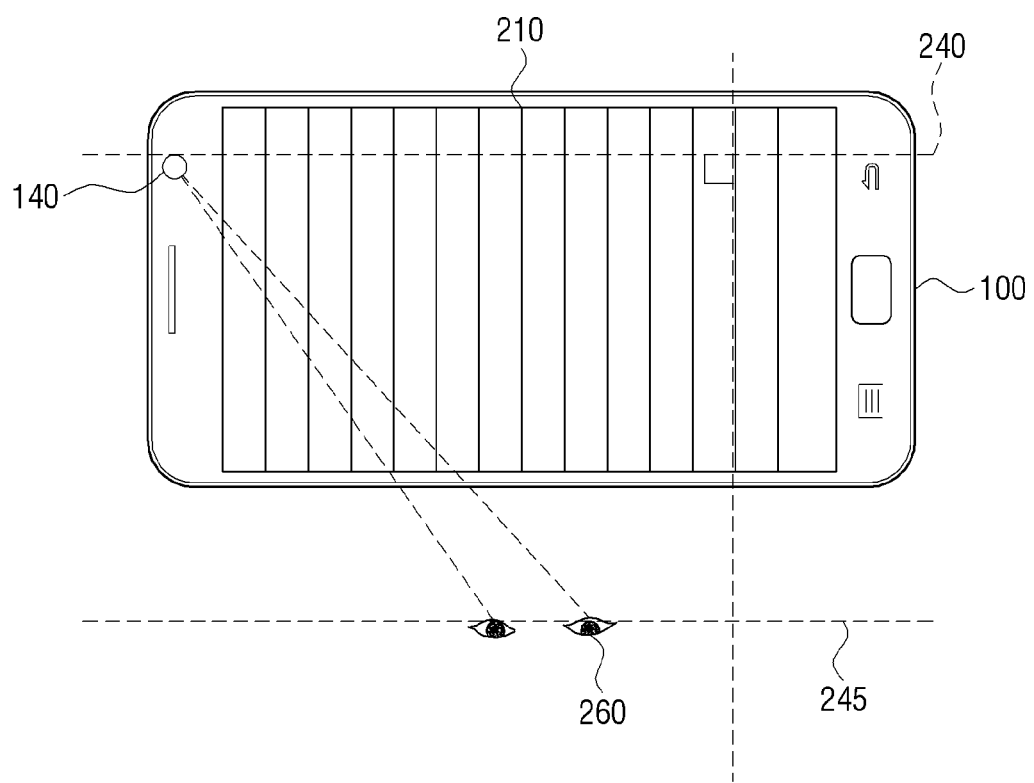
FIG. 14 is a view illustrating a method of sensing a user's eye gaze according to an exemplary embodiment of the present general inventive concept.

Referring to FIGS. 13 and 14, the display unit 110 is configured to display an image. As mentioned above, the display unit 110 includes a screen or a touch screen which may also serve as an input device. The display unit 110 may display a normal image, that is, a 2D image, or a 3D image, according to an operation mode of the display apparatus 100, and a 3D display film 210 may be attached to or detached from the display unit 110 or a portion of the display apparatus 100.

Figure 16:
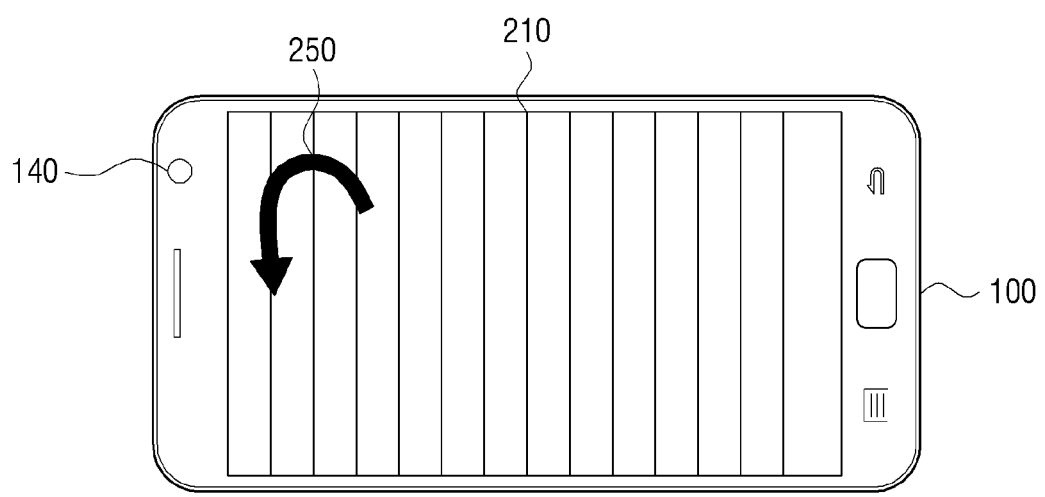
FIG. 16 is a view illustrating a guide UI for adjusting a user's eye gaze according to an exemplary embodiment of the present general inventive concept.

Further, the display unit 110 may display a guide UI 230. The guide UI 230 may indicate a direction to adjust the 3D display film 210 as mentioned in FIGS. 9 and 12. Furthermore, a guide UI 250 (as shown in FIG. 16) to indicate how to adjust a user's eye gaze according to a user's eye gaze sensed by the eye gaze sensing unit 140 may be displayed. The guide UI 250 to adjust a user's eye gaze will be further described below.

As mentioned above, the sensing unit 120 may sense whether the 3D display film 210 is attached or detached, and the control unit 130 controls an overall operation of the display apparatus 100.

The eye gaze sensing unit 140 is configured to sense a user's eye gaze at the display apparatus 100. The eye gaze sensing unit 140 may be configured to include various sensors to sense a user's eye gaze. For example, the eye gaze sensing unit 140 may include a camera. The eye gaze sensing unit 140 may sense a user's eye gaze by analyzing a user's image captured by the camera. For example, when a user's image is captured by the camera, the eye gaze sensing unit 140 may divide the captured image into a plurality of blocks in a horizontal and a vertical direction, in which one block may be composed of a plurality of pixels. The eye gaze sensing unit 140 may detect a property value of pixels included in each block, and compare the property value with an adjacent block to determine whether the block is a block which constitutes an identical object. The eye gaze sensing unit 140 may perform such a process of determination for each block, detect an edge portion of each object, and by considering a color, a shape and a size of each region divided according to the edge portion, sequentially detect a user's face area, an eyeball area, an iris area, and central coordinates of an iris.

In this detecting process, various algorithms and models may be applied. For example, the eye gaze sensing unit 140 may use a selective concentrating model with respect to a user image. For example, a face area may be detected using a Saliency Map (SM) model. The eye gaze sensing unit 140 may detect an eyeball area using an AdaBoost algorithm in the detected face area, and a pupil area may be detected from the detected eyeball area. The eye gaze sensing unit 140 may detect central coordinates of the detected pupil, and then perform mapping of positions of the central coordinates and of the screen displayed in the display unit 110. Based on the mapping, the eye gaze sensing unit may determine where the central coordinates of the pupil are directed in the screen. As eye-gaze tracking algorithms have been published in various documents, further specific explanation thereof will be omitted.

The control unit 130 may control the display unit 110 to display a guide UI 250 (as shown in FIG. 16) to adjust a user's eye gaze according to results sensed by the eye gaze sensing unit 140.

The storage unit 150 may be configured to store user data, various software modules, and data for driving the display apparatus 100. That is, the storage unit 150 may store software which includes a base module, a sensing module, a communication module, a presentation module, a web browser module and a service module. The base module is a basic module which processes signals transmitted from each hardware included in the display apparatus 100 and transmits the processed signals to an upper layer module. The sensing module is a module which collects information from various sensors, analyzes and manages the collected information, and may include a face recognition module, a voice recognition module, a motion recognition module, an NFC recognition module and the like. The presentation module is a module for configuring the display screen 110, and may include a multimedia module for outputting multimedia contents by playing the contents, a UI, and a UI rendering module for performing a graphic process. The communication module is a module for communication with an external device. The web browser module is a module which performs a web browsing for a web server access. The service module is a module which includes various applications for providing various services.

As mentioned above, the storage unit 150 may include various program modules, and some of the various program modules may be omitted, modified or added according to a type or characteristic of the display apparatus 100.

The communication unit 160 is configured to perform communication with various types of external devices according to various types of communication methods. That is, the communication unit 160 may include various communication chips, such as WiFi chip, Bluetooth chip, Near Field Communication (NFC) chip and wireless chip. The WiFi chip, Bluetooth chip and NFC chip perform communication in the manner of WiFi, Bluetooth and NFC, respectively. Among them, the NFC chip is a chip which operates in the manner of NFC, e.g., using a band of 13.56 MHz, among various RF-ID frequency bands of 135 kHz, 13.56 MHz, 433 MHz, 860-960 MHz and 2.45 GHz. In the case of using the WiFi chip or Bluetooth chip, various pieces of connection information, such as a service set identifier (SSID) and a session key, are transmitted and received first, and communication is connected by using the information, and thereafter, various pieces of information are transmitted. The wireless communication chip may be a chip which performs communication according to any of various communication standards, such as, for example, IEEE, Zigbee, 3rd Generation (3G), 3rd Generation Partnership Project (3GPP) and Long Term Evolution (LTE).

The input unit 170 is configured to receive input of a user command to control the display apparatus 100. For example, if the display apparatus 100 is a mobile phone, the input unit 170 may receive input of a user command by text or voice to control various applications and functions of the phone. In addition, if the display unit 110 includes a touch screen the display apparatus may also receive use input via the touch screen.

FIG. 14 is a view specifically illustrating an example of a user's eye gaze appropriate for watching a 3D image.

When the display apparatus 100 is positioned facing a user's eyes, the display apparatus 100 should optimally be aligned parallel with the user's eyes.

For example, the eye gaze sensing unit 140 may sense whether a virtual line 240 crossing the display apparatus 100 is in parallel with a line 245 connecting a user's two eyes 260.

However, when the eye gaze sensing unit 140 senses that the virtual line 240 crossing the display apparatus 100 is not parallel with the line 245 connecting the user's two eyes 260, the control unit 130 may control the display unit 110 to display a guide UI 250 (as shown in FIG. 16) to indicate a direction to adjust the display apparatus 100 or a user's eye gaze, based on the result sensed by the eye gaze sensing unit 140. For example, as illustrated in FIG. 15, when the eye gaze sensing unit 140 senses that a left side of the line 245 connecting the user's two eyes 260 goes down as compared against the case where the virtual line 240 crossing the display apparatus 100 is in parallel with the line 245 connecting the user's two eyes 260, the control unit 130 may determine that a left end of the display apparatus 100 is required to go down to be adjusted to the optimal position of alignment with the user's two eyes 260.

Accordingly, as illustrated in FIG. 16, the control unit 130 may display the arrow-shaped guide UI 250 to direct a user to adjust the display apparatus to bring it into optimal alignment with the user's eye gaze, i.e., in this case, direct the user to move a left end of the display apparatus 100 downward. The arrow-shaped guide UI 250 is merely an exemplary embodiment, and the guide UI 250 may be displayed using any of a variety of colors or methods. For example, a text message may be displayed, a voice message may be transmitted to a user, or any combination of indications thereof may be employed.

Figure 15:
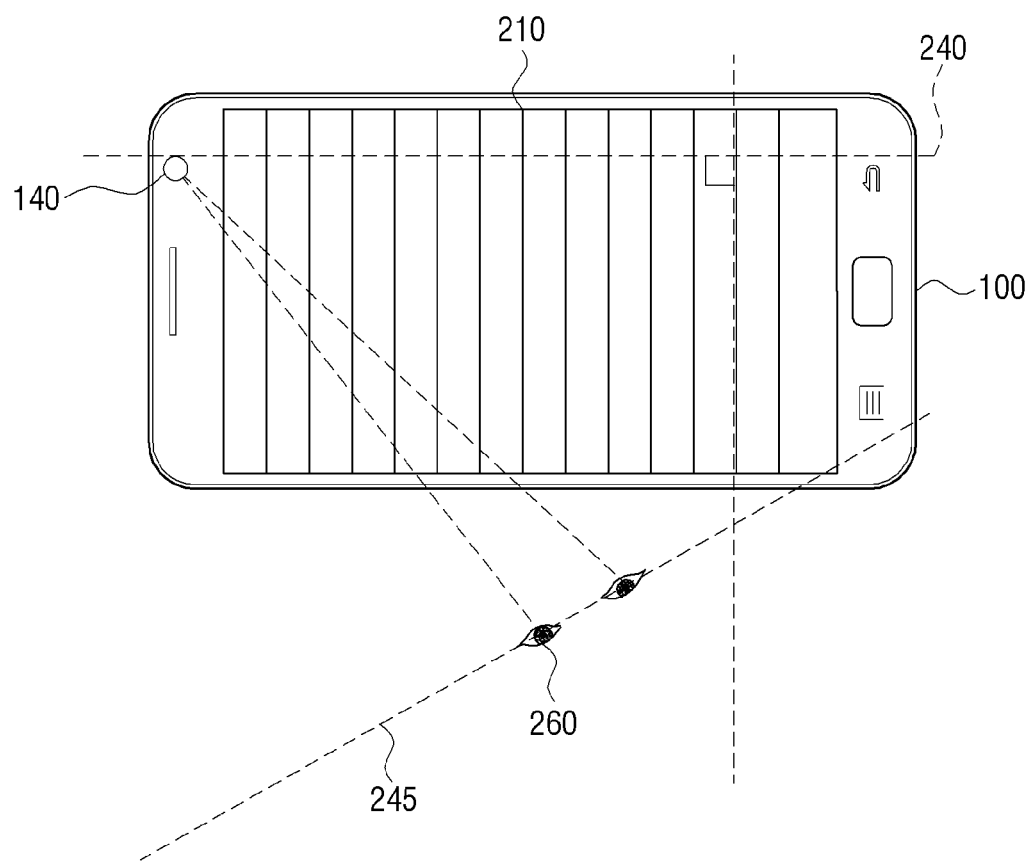
FIG. 15 is a view illustrating an example of an inappropriate eye gaze of a user.

Further, although FIGS. 14 to 16 illustrate that, based on the result of a user's eye gaze sensed by the eye gaze sensing unit 140, the control unit 130 determines a direction of the guide UI 250 to show a user in which direction the display apparatus 100 should be moved, the control unit 130 may also determine a direction of the guide UI 250 to show a user in which direction the user should move, according to a type of a display apparatus 100 or a user's instruction.

Figure 17:
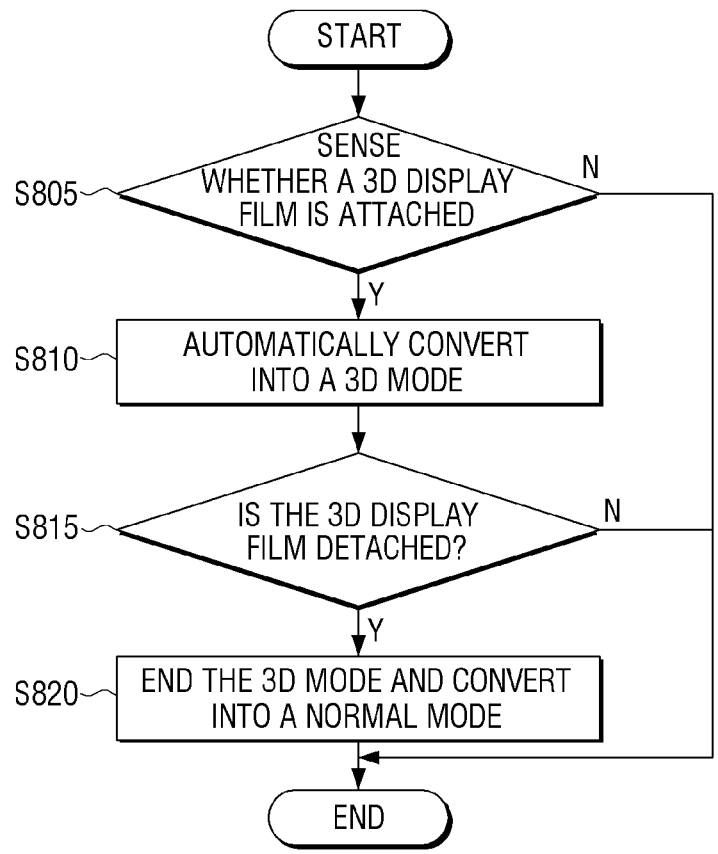
FIG. 17 is a flow chart illustrating a display method according to an exemplary embodiment of the present general inventive concept.

FIG. 17 is a flow chart illustrating an automatic conversion to a 3D display mode by attaching the 3D display film 210 to the display apparatus 100, according to an exemplary embodiment of the present general inventive concept.

The display apparatus 100 senses whether the 3D display film 210 is attached or detached (operation S805). The display apparatus 100 and the 3D display film 210 each may be attached, for example, by including a concavo-convex portion or a magnetic body.

In the case where the display apparatus 100 and the 3D display film 210 include a concavo-convex portion, connection of the display apparatus 100 and the 3D display film 210 may be sensed, for example, using a photo sensor. In the case where the display apparatus 100 and the 3D display film 210 include a magnetic body, connection of the display apparatus 100 and the 3D display film 210 may be sensed, for example, using a magnetic field sensor.

There may be at least four concavo-convex portions and/or four magnetic bodies such that at least one concavo-convex portion and/or magnetic body is placed at each corner of the display apparatus 100 and the 3D display film 210. This is merely an exemplary embodiment without limitation as to the number and position thereof. Further, the display apparatus 100/display unit 110 and the 3D display film 210 may have a concavo-convex portion at each corner, and have a magnetic body within both ends of each concavo-convex portion, so as to minimize movement of the display apparatus 100 and the 3D display film 210 after being attached.

Further, when it is sensed that the display apparatus 100 and the 3D display film 210 are not attached accurately or a position is incorrectly attached, a guide UI 230 may be displayed to indicate how to adjust the 3D display film 210.

When the display apparatus 100 senses that the 3D display film 210 is attached (operation S805-Y), the display apparatus 100 automatically converts into a 3D mode (operation S810). That is, without user input of a mode conversion, the display apparatus 100 senses that the 3D display film 210 is attached and automatically converts into a 3D mode to display a 3D mode image.

When the display apparatus 100 determines that the 3D display film is detached (operation S815), the 3D mode ends and the display apparatus 100 converts into a normal mode (operation S820).

In the case where the 3D display film is not appropriately attached, or a user's eye gaze is not at a correct position, the display apparatus 100 may display various guide UIs 230, 250. Since examples of displaying such guide UIs are specifically described above, an illustration of the flow chart and an explanation therefor will be omitted.

Figure 18:
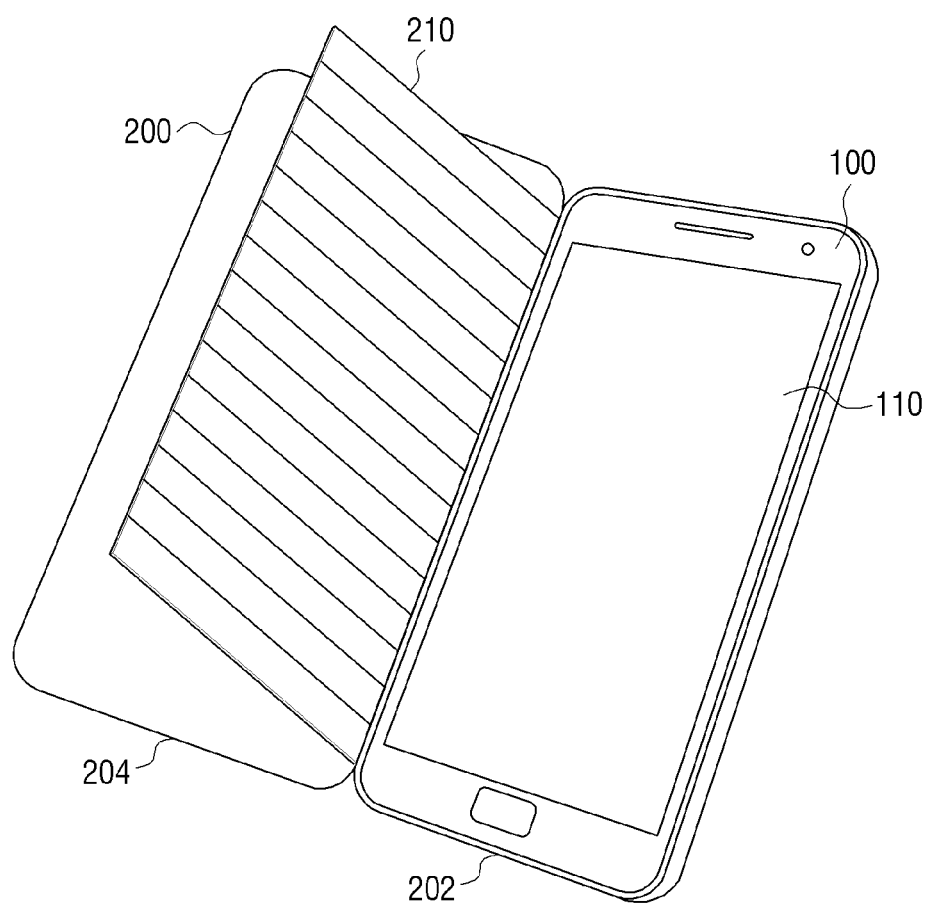
FIG. 18 is a view illustrating an example in which a 3D display film is connected to a case, according to an exemplary embodiment of the present general inventive concept.
Figure 19:
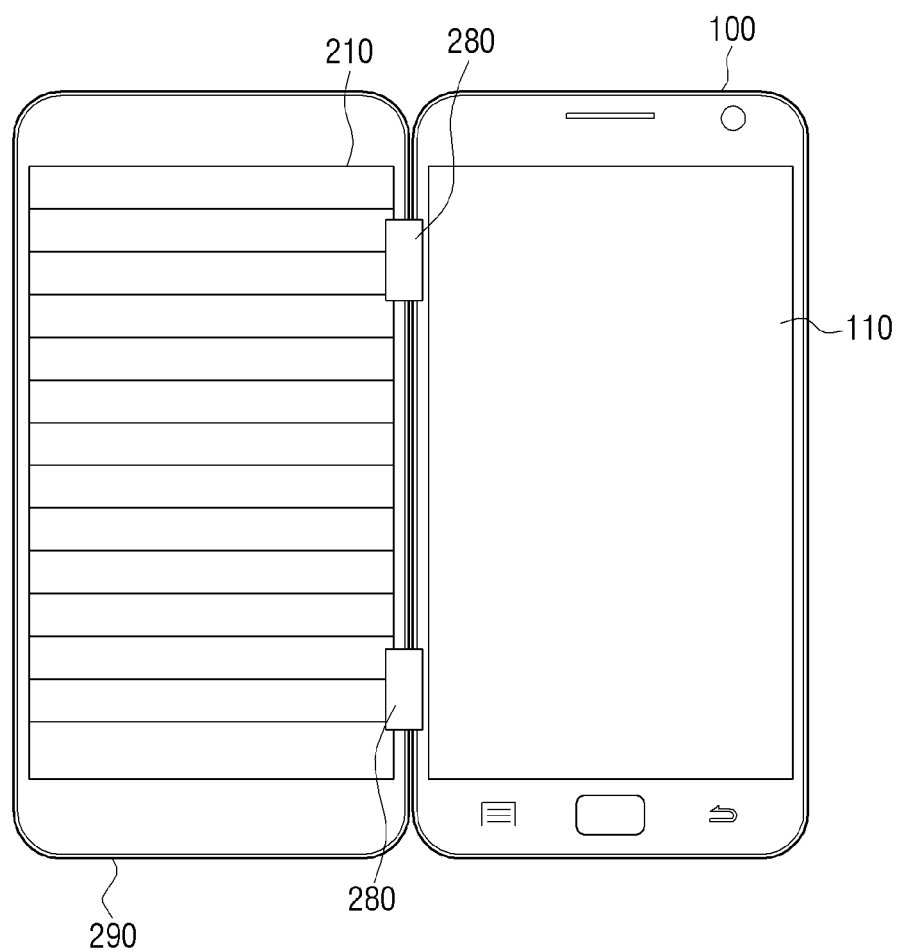
FIG. 19 is a view illustrating a 3D display film connected through a hinge unit according to an exemplary embodiment of the present general inventive concept.

Although the 3D display film 210 is described above as a separate film from the display apparatus 100, the 3D display film 210 may be embodied in a shape connected to the case 200 as illustrated in FIG. 18. The case 200 may include a first frame 202 having a portion for holding the display apparatus 100 and a second frame 204 foldably attached to the first frame 202. The 3D display film 210 may be attached to either the first frame 202 or the second frame 204. If the 3D display film 210 is attached to the first frame 202, the second frame 204 may be omitted. Alternatively, the 3D display film 210 may be integrally embodied in a cover shape 290 connected to a main body of the display apparatus 100 through a hinge 280 as illustrated in FIG. 19, according to another exemplary embodiment of the present general inventive concept.

In this embodiment, the control unit 130 may determine whether the 3D display film 210 covers the screen of the display unit 110. If it is determined that the screen of the display unit 110 is covered, the control unit 130 automatically converts into a 3D mode, and if the control unit 130 determines that the screen of the display unit 110 is uncovered, the control unit 130 automatically converts into a normal mode.

As mentioned above, according to various exemplary embodiments of the present general inventive concept, a user may freely attach and detach the 3D display film to and from the display apparatus 100. Further, according to the attaching and detaching state, an image is automatically converted to maximize user convenience. If necessary, an appropriate guide UI 230, 250 may be provided to improve user satisfaction.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory device, a read-only memory (ROM), a random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be constructed by programmers skilled in the art to which the present general inventive concept pertains.

For example, a program code may be stored in a non-transitory readable medium to control hardware for sensing whether a 3D display film is attached or detached, automatically converting into a 3D mode when a 3D display film is attached to a display unit of a display apparatus, and ending a 3D mode and automatically converting into a normal mode when a 3D display film is detached from a display unit. Moreover, a display method described above in various exemplary embodiments may be coded in a program to be stored in a non-transitory readable medium.

The non-transitory computer readable medium refers to a medium that stores data semi-permanently, not for a short time, such as a register, a cache or a memory. Specifically, examples of such non-transitory readable medium include CD, DVD, hard disc, blue-ray disc, USB, a memory card, ROM, etc.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A display method of controlling a display apparatus to which a three-dimensional (3D) film is attachable to cover a display unit of the display apparatus, comprising:
sensing whether the 3D display film is attached to the display apparatus to cover the display unit or detached from the display apparatus;
when said sensing senses that the 3D display film is detached from the display apparatus, automatically converting the display apparatus into a normal mode; and
when said sensing senses that the 3D display film is attached to the display apparatus to cover the display unit:
automatically converting the display apparatus into a 3D mode,
sensing an eye gaze of a user with the display apparatus converted into the 3D mode, and
displaying in the display unit a guide user interface (UI) to indicate at least one of a direction to move the display apparatus and a direction for the user to move, to adjust the eye gaze of the user if an alignment of the sensed eye gaze of the user with the display apparatus does not satisfy a predetermined requirement,
wherein:
the 3D display film comprises a first concavo-convex portion,
the display apparatus comprises a second concavo-convex portion and at least one sensor provided in the second concavo-convex portion, and the sensing uses the at least one sensor to sense whether the 3D display film is attached,
the sensing uses a light emitting diode and a light receiving diode arranged at a side surface of the second concavo-convex portion, and when the 3D display film is detached, light emitted from the light emitting diode enters a light receiving diode, and when the 3D display film is attached, light emitted from the light emitting diode is blocked by the first concavo-convex portion.

2. The display method as claimed in claim 1, further comprising:
determining an attaching state of the 3D display film when the 3D display film is attached to the display apparatus; and
displaying the guide UI to indicate a direction to adjust the 3D display film if the attaching state does not satisfy the predetermined requirement.

3. The display method as claimed in claim 1, wherein:
the 3D display film and the display apparatus are attachable by a magnetic force; and
the sensing whether the 3D display film is attached to the display apparatus to cover the display unit or detached from the display apparatus uses a magnetic field sensor to sense whether the 3D display film is attached.

4. The display method as claimed in claim 1, wherein the 3D display film is attachable to the display apparatus by connection of the first and the second concavo-convex portions.

5. The display method as claimed in claim 1, wherein:
the 3D display film further comprises a first magnetic body;
the display apparatus further comprises a second magnetic body and a magnetic field sensor;
the 3D display film is attachable to the display apparatus by connection of the first concavo-convex portion and the second concavo-convex portion; and
the sensing whether the 3D display film is attached to the display apparatus to cover the display unit or detached from the display apparatus further uses the magnetic field sensor to sense whether the 3D display film is attached.

6. A non-transitory recording medium for recording a program for executing the display method of claim 1.

7. A display apparatus, comprising:
a display unit to which a 3D display film is attachable;
an attaching status sensing unit configured to sense whether the 3D display film is attached to or detached from the display unit;
an eye gaze sensing unit configured to sense an eye gaze of a user in a 3D mode; and
a control unit configured to:
when the attaching status sensing unit senses that the 3D display film is detached from the display unit, automatically convert the display apparatus into a normal mode, and
when the attaching status sensing unit senses that the 3D display film is attached to the display unit:
automatically convert the display apparatus into the 3D mode,
display in the display unit a guide user interface (UI) to indicate at least one of a direction to move the display apparatus and a direction for the user to move, to adjust the eye gaze of the user if an alignment of the display apparatus with the eye gaze of the user sensed by the eye gaze sensing unit does not satisfy a predetermined requirement,
wherein:
the 3D display film comprises a first concavo-convex portion,
the display apparatus comprises a second concavo-convex portion and at least one sensor provided in the second concavo-convex portion, the attaching status sensing unit uses the at least one sensor to sense whether the 3D display film is attached,
the attaching status sensing unit uses a light emitting diode and a light receiving diode arranged at a side surface of the second concavo-convex portion, and when the 3D display film is detached, light emitted from the light emitting diode enters a light receiving diode, and when the 3D display film is attached, light emitted from the light emitting diode is blocked by the first concavo-convex portion.

8. The display apparatus as claimed in claim 7, wherein the control unit determines an attaching state of the 3D display film when the 3D display film is attached to the display unit, and displays in the display unit the guide UI to indicate a direction to adjust the 3D display film when the attaching state does not satisfy the predetermined requirement.

9. The display apparatus as claimed in claim 7, wherein the 3D display film and the display unit each comprise a magnetic body, and
the attaching status sensing unit comprises a magnetic field sensor to sense whether the 3D display film is attached to the display unit.

10. The display apparatus as claimed in claim 7, wherein:
the 3D display film is attachable to the display unit by connection of the first and the second concavo-convex portions.

11. The display apparatus as claimed in claim 7, wherein:
the 3D display film further comprises a first magnetic body;
the display unit further comprises a second magnetic body;
the 3D display film is attachable to the display unit by connection of the first and the second concavo-convex portions;
the attaching status sensing unit further comprises a magnetic field sensor configured to sense a magnetic field which is changed according to a magnetic connection between the first magnetic body and the second magnetic body.

12. A display apparatus, comprising:
a display unit capable of displaying a two-dimensional (2D) image in a 2D mode and a 3D image in a 3D mode on a screen thereof;
an attaching status sensing unit formed at a position of the display apparatus to sense an attaching status of a 3D display element;
an eye gaze sensing unit configured to sense a user's eye gaze in the 3D mode; and
a control unit configured to control the display unit to display at least one of the 2D image and the 3D image according to state of the sensing unit,
wherein:
the 3D display element comprises a first concavo-convex portion,
the display apparatus comprises a second concavo-convex portion and at least one sensor provided in the second concavo-convex portion, the attaching status sensing unit uses the at least one sensor to sense whether the 3D display element is attached,
the attaching status sensing unit uses a light emitting diode and a light receiving diode arranged at a side surface of the second concavo-convex portion, and when the 3D display element is detached, light emitted from the light emitting diode enters a light receiving diode, and when the 3D display element is attached, light emitted from the light emitting diode is blocked by the first concavo-convex portion
the control unit displays in the display unit a guide UI to indicate at least one of a direction to move the display apparatus and a direction for the user to move, to adjust the user's eye gaze if an alignment of the user's eye gaze with the display apparatus does not satisfy a predetermined requirement.

13. The display apparatus of claim 12, wherein the 3D display element is attachable to the display apparatus by at least one of a coupling force and a magnetic force.

14. The display apparatus of claim 12, wherein the attaching status sensing unit further uses at least one of a photo sensor a magnetic force sensor, and a touch sensor to sense the 3D display element.

15. The display apparatus of claim 12, wherein the attaching status sensing unit comprises a plurality of sensors configured to provide output signals indicating an attaching state of the 3D display element at a plurality of corresponding positions on the display apparatus.

16. The display apparatus of claim 15, wherein the control unit is configured to determine an accuracy of the attaching state of the 3D display element at each of the plurality of positions based on the output signals and to communicate an indication of a direction to adjust the 3D display element when at least one of the attaching state does not meet the predetermined requirement.

17. The display apparatus of claim 16, wherein the control unit is configured to compare the output signals with a reference value to determine whether the attaching state meets the predetermined requirement.

18. The display apparatus of claim 16, wherein the communicated indication is an audible message.

19. The display apparatus of claim 16, wherein the communicated indication is displayed on the display unit.

20. The display apparatus of claim 12, wherein the control unit is further configured to communicate an indication of a direction to adjust the alignment of the eye gaze of the user or the display apparatus when the gaze sensing unit senses that the eye gaze of the user is not aligned with the display apparatus according to the predetermined requirement.

* * * * *